Aug. 11, 1959  A. P. SMITH, JR., ET AL  2,898,831
LENS TURRET AND AUXILIARY LENS FOR CAMERAS
Filed Feb. 2, 1955
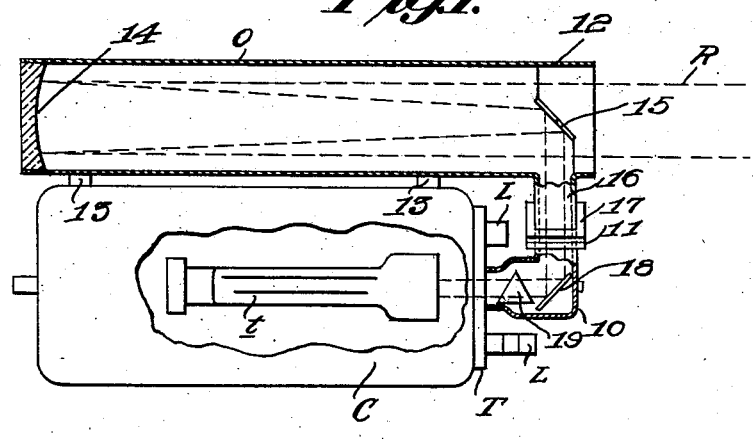
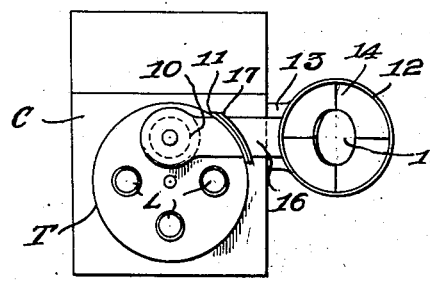
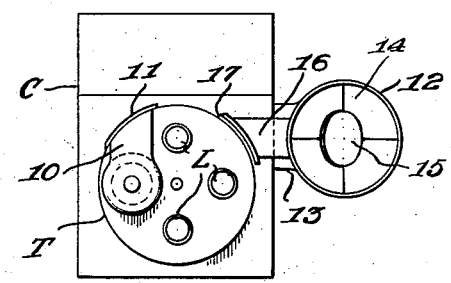
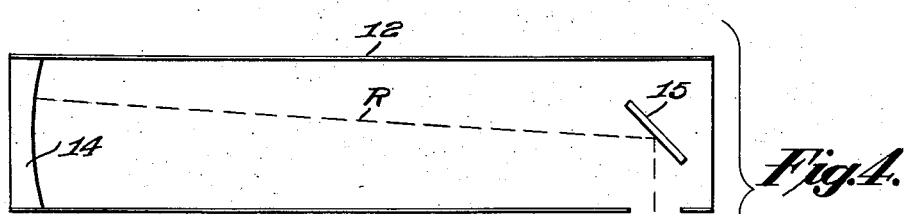
INVENTORS
Alfred P. Smith, Jr.
Earl H. Thoms
BY
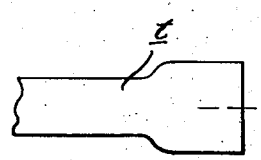
ATTORNEY

United States Patent Office 2,898,831
Patented Aug. 11, 1959

2,898,831

LENS TURRET AND AUXILIARY LENS FOR CAMERAS

Alfred P. Smith, Jr., and Earl H. Thoms, Seattle, Wash.

Application February 2, 1955, Serial No. 485,754

3 Claims. (Cl. 95—11)

This invention relates to a lens turret and an auxiliary lens for cameras and more particularly to the association of a telephoto lens and lens turret with a television camera.

It is customary to provide a camera or similar instrument with a lens turret which is pivotally mounted on the front of the camera housing and carries a plurality of lenses (usually four) of different focal length. Thus, when changing from one scene or vantage point to another, the lens of proper focal length is disposed in operative position in alignment with the light aperture of the camera merely by rotation of the lens turret.

Certain types of telephoto lenses, especially certain types that are now used frequently with television cameras, are large, cumbersome and heavy. It has been proposed that these lenses be mounted as one of the lenses on a turret. Due to the weight of this type of lens (actually it is an optical system), the camera is unbalanced and unsteady operation results. Consequently, when it is possible to do so, the operator mounts these tele-objectives independently and removes them from the camera as soon as they are not required.

Having in mind the defects of the prior art apparatus, it is the primary object of the present invention to provide a telephoto lens or objective and lens turret for use with a camera in substantially balanced relation to the support for the camera.

Another object of the invention is to provide a lens turret adapted for cooperation with auxiliary lenses which are independent of the turret.

A further object of the invention is to provide a telephoto objective and lens turret, particularly for television cameras, having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts through the several figures and in which:

Figure 1 is a diagrammatic top plan view of a television camera showing the invention applied thereto, the camera housing being broken away to show the tube and the structure of the invention being mostly in horizontal section;

Figure 2 is a front elevational view showing the telephoto objective in operative association with the camera;

Figure 3 is a similar view showing the telephoto objective in inoperative association with the camera, and Figure 4 is a top diagrammatic view of the optical system according to the invention.

Referring now specifically to the drawing, C designates a television camera provided with the usual camera pickup tube $t$ and the usual lens turret T rotatably mounted on the front end of the camera casing. The turret T, in conformity with usual practice, is provided with a plurality of openings in each of which is supported an objective lens L.

In accordance with the present invention, the turret is modified by the provision of a relatively short, right-angular light transmitting tube or conduit 10 mounted over and in communication with one of the openings in the turret. The free end of the tube 10 is open and is curved on a radius from the axis of the turret and this radius is greater than that of the outer peripheries of the lenses L and normally will coincide substantially with the periphery of the turret T. The outer curved end of the tube 10 is provided with an outwardly directed flange 11 for forming a light trap as will hereinafter be described. A reflecting mirror or prism 18 is mounted in the angle of the conduit 10 for reflecting rays from the open end through the turret opening.

The light tube or conduit 10 is adapted for use with an auxiliary objective O mounted on and along one side of the camera C, this objective O being rigidly secured to the camera by any suitable means 13. The objective O preferably comprises a telephoto system and includes a housing or barrel 12 open at the front end and provided at the rear end thereof with a parabolic reflector 14. Adjacent the front open end of the barrel 12 is disposed a diagonal light reflecting prism or mirror 15 which is preferably disposed at an angle of 45° to the axis of objective O to reflect the image rays laterally.

The barrel 12 is provided with a laterally extending light transmitting conduit 16 which is normal to the axis thereof and which is aligned with the reflector 15 and adapted for alignment with the conduit 10 upon rotation of the turret T to the position in which the tube 10 is in operative position in front of the camera light aperture. The conduit 16 is open at its free end and is also provided with an outwardly directed flange 17 whose outer surface is concentric with the axis of the turret T. The outer surfaces of the flanges 11 and 17 are of substantially equal radii whereby they slidingly overlap upon the alignment of the conduits 10 and 16, as indicated in Fig. 2, and form a light trap which prevents light leaks into the conduits.

As the conduit 10 is of angular form, the image rays are horizontally reversed by the reflectors 15 and 18. To correct this, preferably a correcting prism 19 is disposed in the tube 10 although in television the image can be reversed by the electronic method.

In the operation of the invention, an objective such as the telephoto objective O is mounted on one of the longitudinal walls of a camera C rather than on the front of the camera. Normally, the objective O will be mounted on a side wall of the camera, as shown in the drawing, however, it is obvious that it can be mounted on the top or bottom walls so that the use of the term side wall is intended to distinguish any wall other than the front or rear wall of the camera.

The angular tube or conduit 10 is mounted on the turret T in one of the lens openings therein, the tube 10 and objective O being positioned so that the tube or conduit 16 is aligned with the free end of the tube 10 and the light trap flanges 11 and 17 properly engage, as shown in Figs. 1 and 2. When in this position, image rays R enter the barrel 12 of the objective O and are returned by the parabolic reflector 14 to the reflector 15 which directs the rays through the conduit 16 into the conduit 10 wherein they are directed by the reflector 18 through the correcting prism 19, if used, to the pickup tube $t$ in the camera C, as shown in Figs. 1 and 4.

When it is desired to use another objective lens, the turret T is merely rotated to position the desired lens L in operative alignment with the light aperture and tube

*t* of the camera C, as shown in Fig. 3. In this position, the light rays emanating from the tube 16 of the objective O merely pass harmlessly across the camera. Any light entering the tube 10 through its open end is reflected harmlessly against the front wall of the camera C.

With the structure disclosed, the telephoto objective O is in substantial weight balanced relation to the camera C and the readily alignable and separable conduits 10 and 16 provide for selective use of the objective O or any of the other lenses L carried by the turret T.

Although a certain specific embodiment of the invention has been shown and described, it is obvious that many modifications thereof are possible. The invention, therefore, is not to be restricted except insofar as is necessitated by the prior art and by the spirit of the appended claims.

What we claim and desire to secure by U.S. Letters Patent is:

1. In combination with a camera including a casing having an aperture in the front wall thereof and a lens turret rotatably supported on said front wall and having a plurality of circumferentially spaced light transmitting openings selectively alignable with said aperture, an objective mounted on a side wall of said casing in substantially rigid balanced relation to said camera with its axis substantially parallel to the axis of said camera aperture and turret, said objective having a lateral image emitting opening adjacent said turret for emitting an image transversely across in front of said turret, a reflector device mounted on said turret in fixed relation therewith in communication with one of said openings and disposed to receive the image emitted by said objective when said turret is adjusted with said one opening in operative alignment with said camera aperture, a tube surrounding said image emitting opening and extending laterally of said objective toward said turret, and a laterally extending conduit on said reflector device and alignable with said tube when said reflector device is in operative relation to said camera aperture, the alignable ends of said tube and conduit having curved surfaces concentric to the axis of said turret to permit rotation of said turret and alignment of said ends, whereby adjustment of said turret to position said reflector device in alignment with said camera aperture places said aperture in image receiving relation to said image emitting opening of said objective and the balanced relation of said objective with said camera enables smooth swinging of the camera across a scene or from one scene to another.

2. The combination set forth in claim 1 wherein said tube and conduit ends comprise laterally directed, concentric, slidably engageable light-trap forming flanges.

3. The combination set forth in claim 1 wherein said reflector device comprises a reflector element and a reversion correction prism.

References Cited in the file of this patent

UNITED STATES PATENTS

| | | |
|---|---|---|
| 2,502,788 | Hunter | Apr. 4, 1950 |
| 2,561,774 | Back | July 24, 1951 |
| 2,680,999 | Newton | June 15, 1954 |

FOREIGN PATENTS

| | | |
|---|---|---|
| 215,434 | Switzerland | Oct. 1, 1941 |